(12) United States Patent
Takano

(10) Patent No.: US 6,230,300 B1
(45) Date of Patent: May 8, 2001

(54) METHOD AND APPARATUS FOR THE OPTIMIZATION OF A TREE DEPTH FOR CLOCK DISTRIBUTION IN SEMICONDUCTOR INTEGRATED CIRCUITS

(75) Inventor: Midori Takano, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/065,425

(22) Filed: Apr. 24, 1998

(30) Foreign Application Priority Data

Apr. 25, 1997 (JP) .................................................. 9-109424
Apr. 17, 1998 (JP) ................................................ 10-107836

(51) Int. Cl.$^7$ .................................................. G06F 15/00
(52) U.S. Cl. .................................................. 716/2
(58) Field of Search .................................... 716/12

(56) References Cited

U.S. PATENT DOCUMENTS 5,410,491   4/1995  Minami ................................ 364/491
5,557,779   9/1996  Minami ................................ 395/500
6,006,025 * 12/1999 Cook ..................................... 716/12

FOREIGN PATENT DOCUMENTS 5-54100    3/1993  (JP) .

* cited by examiner

Primary Examiner—Matthew Smith
Assistant Examiner—Thuan Do
(74) Attorney, Agent, or Firm—Foley & Lardner

(57) ABSTRACT

A method optimizes a tree depth of an H-tree network for distributing a clock signal to elements of a semiconductor integrated circuit, in a way as to minimize power consumption of the H-tree network. The method has the steps of entering parameters, defining a short circuit current component PS, cell internal switching current component PI, and switching current of interconnect capacitance component PW of the power consumption of the H-tree network with equations employing a tree depth m as a variable, defining the power consumption F of the H-tree network as the sum of the components PS, PI, and PW, and finding a tree depth that minimizes the power consumption F. The method differentiates the power consumption F, i.e., the sum of the components PS, PI, and PW with respect to the tree depth m as $\partial F/\partial m$ and solves "$\partial F/\partial m=0$" to find the optimum tree depth of the H-tree network.

8 Claims, 5 Drawing Sheets

METHOD AND APPARATUS FOR THE OPTIMIZATION OF A TREE DEPTH FOR CLOCK DISTRIBUTION IN SEMICONDUCTOR INTEGRATED CIRCUITS

BACKGROUND OF THE INVENTION

1. Field of the Invention

The present invention relates to a technique of distributing a clock signal to elements of a semiconductor integrated circuit, and particularly, to a method and apparatus for optimizing a depth of a tree network for clock distribution with minimal power consumption.

2. Description of the Prior Art

Improvements in semiconductor technology have developed large-scale, high-speed semiconductor integrated circuits. These circuits have many elements that must receive clock signals whose frequencies are increasing these days.

Synchronous systems realize correct operation timing on elements by synchronizing the operation timing in response to rising edges and falling edges of a clock signal. Ideally, all elements in a semiconductor integrated circuit which need a clock signal must receive it without delay. Actually, the clock signal received by the elements involves delay due to the resistance and capacitance of the metal lines used to distribute the clock signal to the elements. If two elements which are controlled by the same clock signal are at different distance from the clock root driver, they will receive the clock signal at different times. This arrival time differential is called skew. A large skew spoils synchronism in the operation of the elements, and therefore, the skew must be minimized by reducing the delay.

An H-tree network for distributing a clock signal to elements of a semiconductor integrated circuit was proposed by S. Dhar et al in "Reduction of clock delays in VLSI structures," Proc. IEEE Int. Conf. on Computer Design, 1984. Improved H-tree networks are disclosed in Japanese Patent Application Publication Nos. 3-030721 and 3-137851.

The H-tree networks usually employ multistage buffering to reduce delay in distributing a clock signal. The multistage buffering arranges buffer cells at nodes in several stages of an H-tree network in a semiconductor integrated circuit, so that a clock signal is distributed from a root driver to elements of the integrated circuit through the buffer cells. In the multistage buffering, first-stage buffer cells drive second-stage buffer cells, the second-stage buffer cells drive third stage buffer cells, and so on. Last-stage buffer cells directly drive each of the elements which are grouped. Each group contains at least one of elements. In each group of elements, no H-tree is formed, and the elements are connected to one another through shortest wiring. Such a group of elements is sometimes called a "cluster."

However, the prior arts mentioned above give no consideration on power consumption of an H-tree networks.

To reduce power consumption of a clock distribution network, J. Cong et al proposed a technique of optimizing the size of buffer cells, i.e., the gate length and width of each CMOS transistor, or the width of the metal lines that carry the clock signal to the elements, in "Simultaneous Driver and Wire Sizing for Performance and Power Optimization," Proc. IEEE Int. Conf. on CAD, 1994. The objective of this prior art, however, is an H-tree network without multistage buffering, and therefore, the prior art is inapplicable to H-tree networks employing multistage buffering.

SUMMARY OF THE INVENTION

An object of the present invention is to provide a method and apparatus for easily and quickly calculating the optimum depth of a tree network for distributing a clock signal to elements of a semiconductor integrated circuit, so that the tree network may work with minimum power.

Another object of the present invention is to provide a method and apparatus for speedily calculating the optimum depth of a tree network for distributing a clock signal to elements of a semiconductor integrated circuit without a knowledge of skilled designers, thereby reducing the development period and manufacturing cost of semiconductor devices.

In order to accomplish the objects, the present invention provides a method for optimizing a tree depth of an H-tree network for distributing a clock signal to elements of a semiconductor integrated circuit. The principle of the method is shown in FIG. 6. The method includes the steps of (a) entering parameters, (b) defining a short circuit current component PS, cell internal switching current component PI, and switching current of interconnect capacitance component PW of power consumption of the H-tree network with equations employing a tree depth m as a variable, (c) defining the power consumption F of the H-tree network as the sum of the components PS, PI, and PW, and (d) finding a tree depth that minimizes the power consumption F. The parameters set in the step (a) are those needed to define the components PS, PI, and PW with the tree depth m, for instance, an inclination coefficient K related to short circuit currents and the total number N of the elements to receive the clock signal. The parameters K and N are described later.

The short circuit current component PS is expressed as follows:

$$PS = K \times (C0/2^m) \times (N/2^m) \times f \times V^2$$

where m is the tree depth, K is the inclination coefficient, C0 is total load capacitance estimated as the sum of the capacitance of shortest wiring for supplying the clock signal to the elements and the load capacitance of input terminals of the elements, N is the total number of the elements, f is the frequency of the clock signal, and V is a source voltage.

The cell internal switching current component PI is expressed as follows:

$$PI = BPWR \times 2^m \times f \times V^2$$

where m is the tree depth, BPWR is the cell internal switching current per the frequency of the clock signal of each buffer cell through which the clock signal is supplied to a corresponding group of the elements, f is the frequency of the clock signal, and V is the source voltage.

The switching current of interconnect capacitance component PW is expressed as follows:

$$PW = ((A \times 2^{(m/2)-1} - 1) \times L \times Cunit + 2^m \times Cin) \times f \times V^2$$

where m is the tree depth, L is an averaged side length of a rectangular area in which the elements are distributed, Cunit is the capacitance of a unit length, Cin is the load capacitance of an input terminal of each element, A is a wiring length coefficient depending on the tree depth m, f is the frequency of the clock signal, and V is the source voltage.

The step (d) differentiates the power consumption F of the H-tree network, i.e., the sum of the components PS, PI, and PW with respect to the tree depth m as $\partial F / \partial m$ and finds the tree depth that minimizes the power consumption F by solving the following equation:

$$\partial F / \partial m = 0$$

In this way, the present invention easily finds the optimum tree depth that minimizes the power consumption F of the H-tree network presented as the sum of the components PS, PI, and PW without a knowledge of skilled designers, thereby reducing the designing and developing periods and manufacturing costs of semiconductor devices.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Embodiments of the present invention will be explained with reference to the accompanying drawings.

Figure 1:
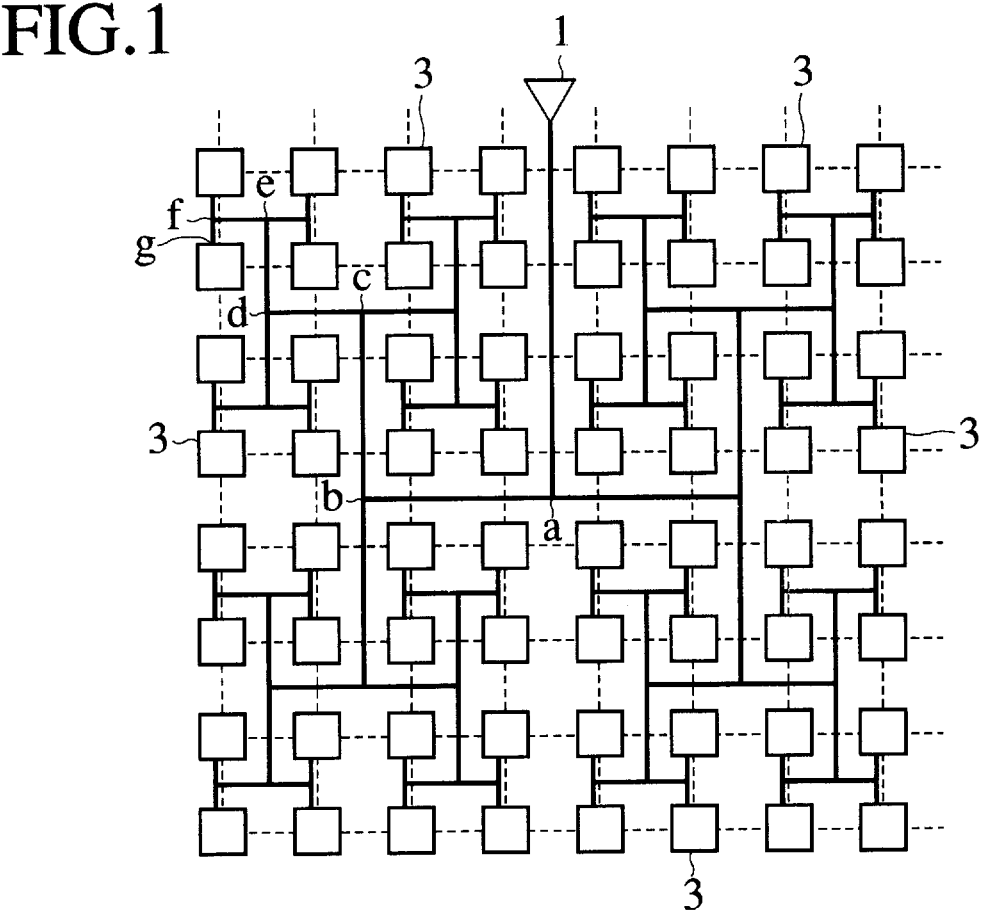
FIG. 1 is a plan view showing an H-tree network for distributing a clock signal to elements of a semiconductor integrated circuit, according to the present invention.
Figure 2:
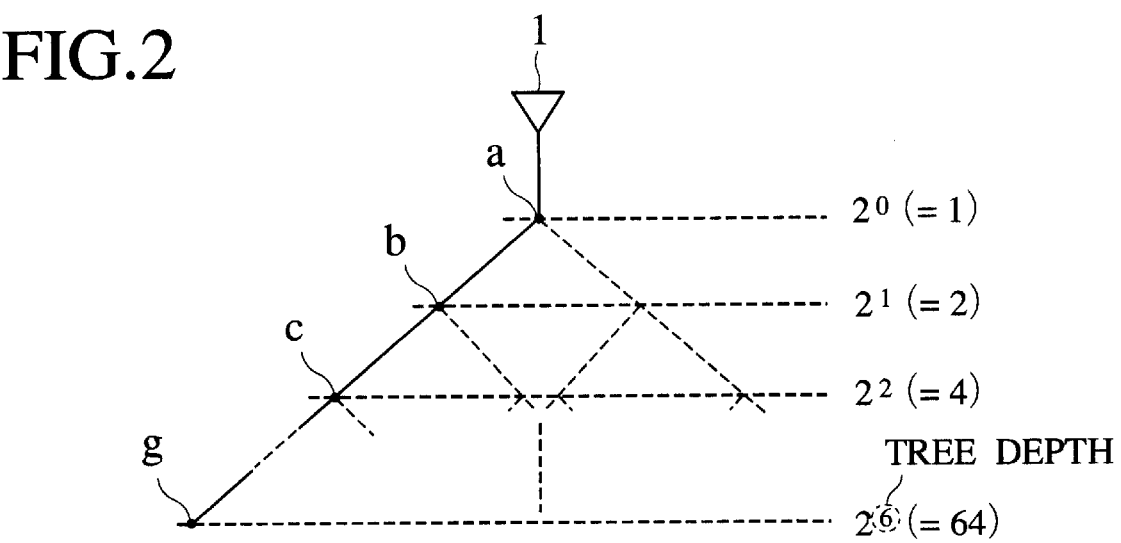
FIG. 2 explains a depth of an H-tree network.

FIG. 1 is a plan view showing an H-tree network for distributing a clock signal to elements of a semiconductor integrated circuit, according to the present invention. This H-tree is called a "completely symmetrized H-tree." The H-tree network is indicated with a thick line and is composed of a repetition of H-shaped wiring. The H-tree network distributes a clock signal from a root driver 1 to all groups 3. Each group 3 contains at least one element, which is a flip-flop in this example. Every wiring segment that connects a pair of the groups 3 has an identical length. Buffer cells are arranged at branching points of the H-tree network. The buffer cells in the last stage of the H-tree network directly distribute the clock signal to the flip-flop groups 3.

Since each H-shaped wiring in the H-tree network is symmetric, the clock signal provides the same delay on every flip-flop group 3.

The power consumption of the H-tree network of FIG. 1 will be explained.

As explained above, the power consumption of an H-tree network employing multistage buffering has the following three components:

(A) The first component arises from transitional short circuit currents, hereinafter called short circuit current component PS.

(B) The second component arises from cell internal switching currents consumed internally by buffer cells, hereinafter called cell internal switching current component PI.

(C) The third component arises from switching currents to charge and discharge the capacitance of the H-tree network, hereinafter called switching current of interconnect capacitance component PW.

Each of these components will be explained.

First, the short circuit current component PS will be explained. The flip-flops, buffer cells, and root driver are made of CMOS transistors. Each CMOS transistor consists of a pMOS transistor and an nMOS transistor. When the PMOS and nMOS transistors are both turned on, a short circuit current flows to consume power. This power consumption is the short circuit current component PS. The component PS mainly derives from the flip-flops, and therefore, it will decrease by reducing the short circuit currents of the flip-flops. The short circuit current of a group of flip-flops is dependent on the load capacitance of the group, and the smaller the load capacitance, the lower the short circuit current. This is because the smaller the load capacitance, the smaller a dullness in the waveform of a clock signal supplied to the group. The load capacitance of a group of flip-flops becomes smaller as the number of the flip-flops in the group decreases. Accordingly, reducing the number of flip-flops in each group in the H-tree network decreases the component PS.

The cell internal switching current component PI will be explained. The cell internal switching current component PI corresponds to power consumed by the operation of buffer cells. Power consumed by the buffer cells which directly drive groups mainly forms the cell internal switching current component PI. Accordingly, reducing the number of the buffer cells, in other words, reducing the number of stages of buffer cells in the H-tree network decreases the component PI.

The switching current of interconnect capacitance component PW will be explained. This component corresponds to power consumed by charging and discharging the capacitance of the H-tree network. Accordingly, shortening the length of the H-tree network reduces the switching current of interconnect capacitance component PW.

The power consumption of the H-tree network is the sum of the components PS, PI, and PW. Accordingly, minimizing the sum of these components minimizes the power consumption of the H-tree network. The sum of these components greatly depends on the tree depth of the H-tree network. The tree depth is equal to an exponent on 2 when expressing the number of branches between the root driver and the last-stage buffer cells with an exponent on 2. For example, the H-tree network of FIG. 1 extends from the root driver 1 to the last-stage buffer cells arranged at nodes g, and between them, there are branch points a, b, c, d, e, and f. The number of branch points is 64 (=$2^6$). Since 64 is expressed with 2 powered by 6, the tree depth of the H-tree network of FIG. 1 is 6.

Each of the last-stage buffer cells is connected to a group of flip-flops, and therefore, the number of the branches is equal to the number of the flip-flop groups. If the number of the branches is increased, the tree depth deepens to increase the number of the flip-flop groups. This results in reducing the number of flip-flops in each group, and reducing the length of wiring for connecting the flip-flops in each group. As a result, the load capacitance of each flip-flop group decreases to decrease the short circuit current component PS. This, however, elongates the H-tree network for connecting the root driver to the flip-flop groups, as well as the number of the buffer cells, to thereby increase the cell internal switching current component PI and switching current of interconnect capacitance component PW.

If the tree depth is reduced, the number of the flip-flop groups decreases to shorten the H-tree network and reduce the number of the buffer cells. This results in reducing the components PI and PW. This, however, increases the number of flip-flops in each group to elongate the length of wiring for connecting the flip-flops in each group. As a result, the load capacitance of each group increases to increase the component PS.

In this way, the components PS, PI, and PW are dependent on the tree depth and are unable to simultaneously reduce by adjusting the tree depth. It is difficult to find an optimum tree depth that minimizes the power consumption of the H-tree network, i.e., the sum of the components PS, PI, and PW. The prior arts empirically determine the tree depth of a given H-tree network in a way as to make the resistance of wiring among flip-flops in each group negligible, so that no delay occurs on a clock signal in each group. The prior arts, however, never consider the power consumption of the H-tree network. When arranging buffer cells only in the last stage of multistage buffering of the H-tree network, the prior arts usually determine the tree depth so as to minimize the number of groups of elements, i.e., the number of the buffer cells because reducing the number of the element groups gives substantially no influence on the delay of the H-tree network as a whole. As mentioned above, reducing the number of buffer cells decreases the cell internal switching current component PI. This, however, increases the load capacitance of each element group, to greatly change the short circuit current component PS. As a result, the power consumption of the H-tree network is not always reduced.

The present invention defines the components PS, PI, and PW with a tree depth as a variable and calculates an optimum tree depth that minimizes the sum of the components PS, PI, and PW. Using a tree depth as a variable m, the components PS, PI, and PW are defined as follows:

(A) Short circuit current component PS $$PS = K \times (C0/2^m) \times (N/2^m) \times f \times V^2 \qquad (1)$$

where K is an inclination coefficient related to short circuit currents, C0 is total load capacitance estimated as the sum of the capacitance of shortest wiring for supplying a clock signal to the flip-flops and the load capacitance of input terminals of the flip-flops, N is the total number of the flip-flops, f is the frequency of the clock signal, and V is a source voltage.

The inclination coefficient K will be explained in more detail. A short circuit current "Ithrough" flows between a first voltage (for example, VDD) and a second voltage (for example, VSS) when pMOS and nMOS transistors are both turned on as the clock signal is changing from low to high or high to low. The short circuit current Ithrough is expressed as follows:

$$Ithrough = K2 \times T \qquad (2)$$

where K2 is an inclination of a short circuit current function and T is a slew time.

The slew time T is a time necessary for stabilizing the clock signal at the second voltage after the clock signal is changed from the first voltage to the second voltage. The slew time T is expressed as follows:

$$T = K1 \times C \qquad (3)$$

where K1 is an average of the rise and fall coefficients of the clock signal and C is total load capacitance on the clock signal.

The equations (2) and (3) provide the following equation:

$$Ithrough = K2 \times (K1 \times C) = K1 \times K2 \times C \qquad (4)$$

The inclination coefficient K is equal to K1×K2, and therefore, the equation (4) is written as follows:

$$Ithrough = K \times C \qquad (5)$$

This equation shows that the short circuit current Ithrough is proportional to the total load capacitance C on the clock signal, and the inclination coefficient K is a proportional coefficient for the total load capacitance C.

(B) Cell internal switching current component PI $$PI = BPWR \times 2^m \times f \times V^2 \qquad (6)$$

where m is the tree depth, BPWR is the cell internal switching current per the frequency of the clock signal of each buffer cell through which the clock signal is supplied to a corresponding group of flip-flops, f is the frequency of the clock signal, and V is the source voltage.

(C) Switching current of interconnect capacitance component PW $$PW = (\text{Lap\_m} \times Cunit + 2^m \times Cin) \times f \times V^2 \qquad (7)$$
$$= ((A \times 2^{(m/2)-1} - 1) \times L \times Cunit + 2^m \times Cin) \times f \times V^2$$

where Lap_m is an approximation of the length of the H-tree network with respect to the tree depth m, L is an averaged side length of a rectangular area in which the flip-flops are distributed, Cunit is the capacitance of a unit length, Cin is the load capacitance of an input terminal of each flip-flop, A is a wiring length coefficient depending on the tree depth m, f is the frequency of the clock signal, and V is the source voltage.

Figure 3:
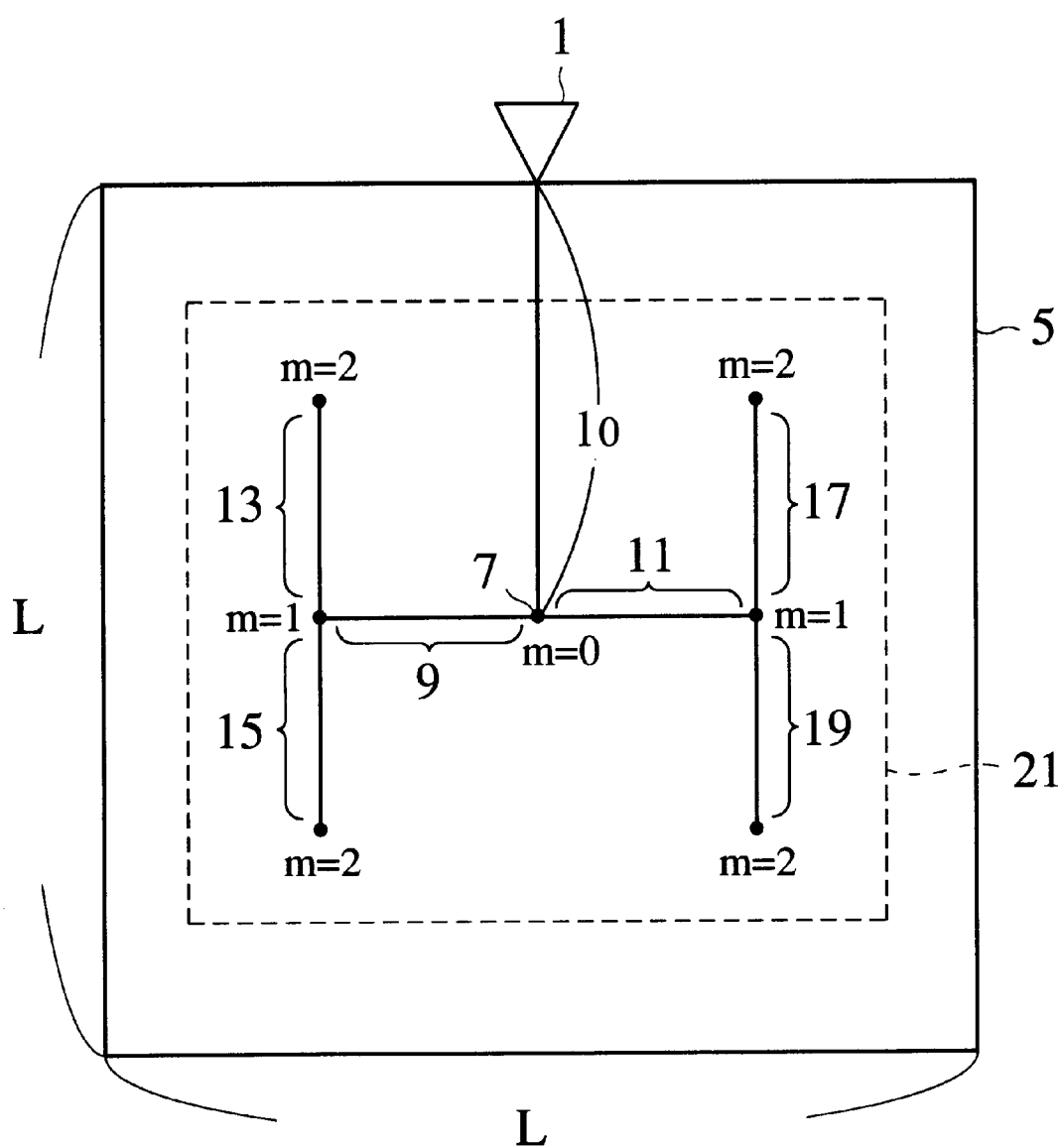
FIGS. 3 and 4 explain the wiring length coefficient depending on a tree depth.
Figure 4:
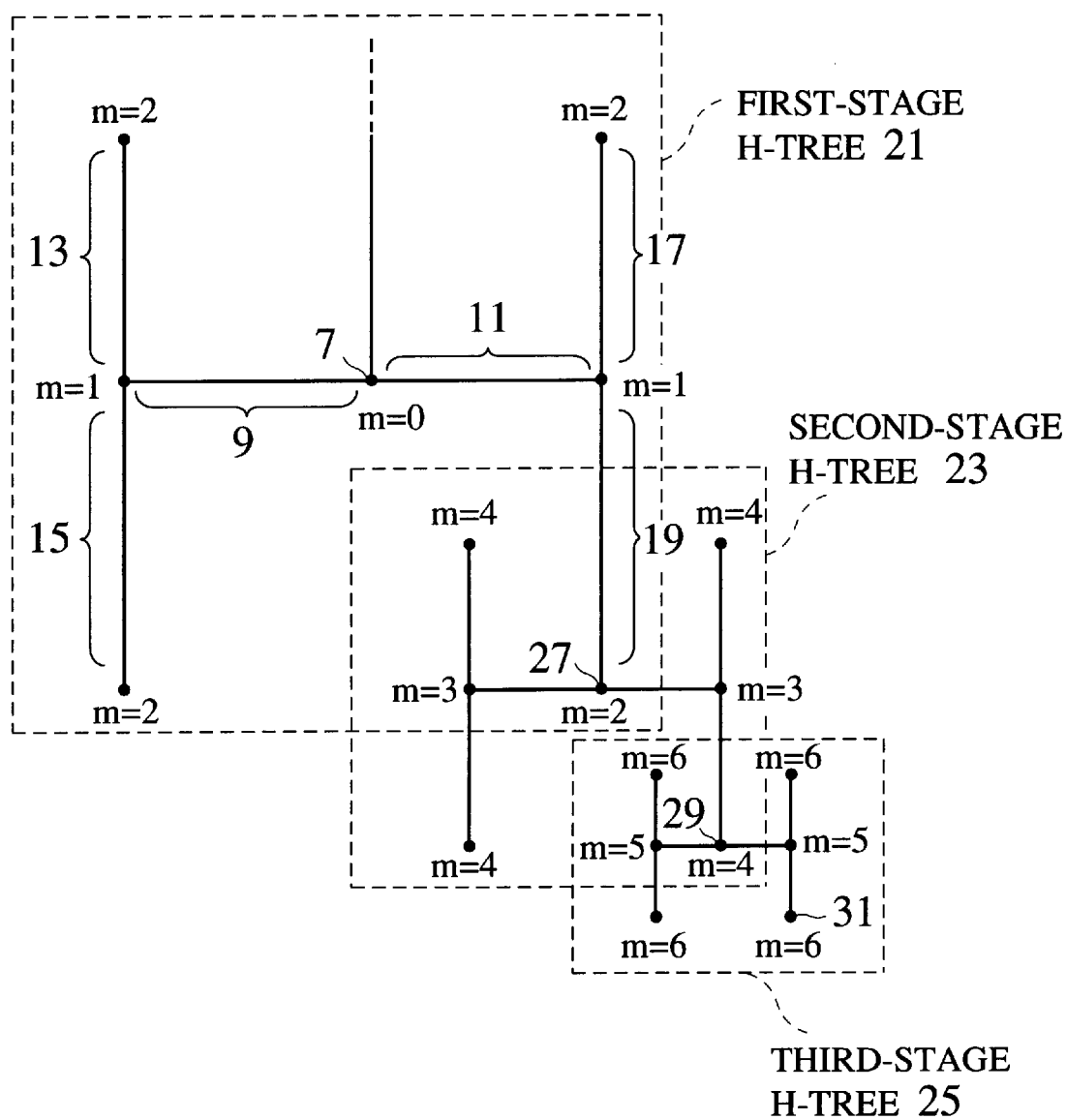

The wiring length coefficient A will be explained in more detail with reference to FIGS. 3 and 4. The flip-flops are distributed in a square area 5 whose sides have each a length of L. A wiring length $l_0$ from the root driver 1 to a branch point 7 is as follows:

$$l_0 = (1/2) \times L \qquad (8)$$
$$= L/2$$

A first-stage H-tree 21 consists of wiring segments 9, 11, 13, 15, 17, and 19 and has a length of $l_1$, which is expressed as follows:

$$l_1 = (3/2) \times L \qquad (9)$$
$$= (1/2^0) \times (3/2) \times L$$
$$= (3L)/2$$

A second-stage H-tree 23 has a length of $l_2$, and a third-stage H-tree 25 has a length of $l_3$. These are expressed as follows:

$$l_2 = (1/2) \times (3/2) \times L \qquad (10)$$
$$= (1/2^1) \times (3/2) \times L$$
$$= (3L)/2^2$$

$$l_3 = (1/2) \times (1/2) \times (3/2) \times L \qquad (11)$$
$$= (1/2^2) \times (3/2) \times L$$
$$= (3L)/2^3$$

Similarly, the length lk of a "k"th-stage H-tree is expressed as follows:

$$lk = (1/2^{(k-1)}) \times (3/2) \times L \qquad (12)$$
$$= (3L)/2^k$$

The number of "k"th-stage H-trees is $4^{k-1}$. According to the equations (8), (9), (10), (11), and (12), the total wiring length Lk from the root driver 1 up to the "k"th H-trees is expressed as follows:

$$Lk = (L/2) \times (1 + (3/2) \times (2^{k+1} - 2)) \quad (13)$$
$$= (L/2) \times (1 + ((3/2) \times 2^{k+1}) - 3)$$
$$= L \times (3 \times 2^{k-1} - 1)$$

The tree depth m at the branch point 7 is 0, that at the branch point 27 is 2, that at the branch point 29 is 4, and that at the branch point 31 is 6. Accordingly, the total length Lk of the equation (13) is true when the tree depth m is an even number. Setting m=2k and the total wiring length as Lm, the equation (13) is expressed as follows:

$$Lm = L \times (3 \times 2^{(m/2)-1} - 1) \quad (14)$$

If the tree depth m is an odd number, for example, 1, the total wiring length is obtained by subtracting the wiring segments 13, 15, 17, and 19 from the length $l_0$ plus $l_1$. The wiring segments 13, 15, 17, and 19 have each the same length of r1, which is expressed as follows:

$$r1 = (1/2) \times L \times (1/2) \quad (15)$$
$$= (1/2) \times L \times (1/2^1)$$

The number N1 of the wiring segments 13, 15, 17, and 19 is equal to the number of branches and is expressed as follows:

$$N1 = 2^2 \quad (16)$$

If m=1, the total wiring length is obtained by subtracting the product of r1 by N1 from the sum of $l_0$ and $l_1$.

If m=3, the total wiring length is obtained by subtracting the product of a length r2 of a segment 33 by the number N2 of branches from the sum of $l_0$, $l_1$, and $4 \times l_2$.

$$r2 = (1/2) \times L \times (1/2) \times (1/2) \quad (17)$$
$$= (1/2) \times L \times (1/2^2)$$

$$N2 = 2^4 \quad (18)$$

If m=2k−1, the total wiring length is obtained by subtracting the product of a segment length of rk by the number Nk of branches from the sum of $l_0$, $l_1$, $4 \times l_2$, $16 \times l_3$, . . . , and $4^{k-1} \times lk$.

$$rk = (1/2) \times L \times (1/2^k) \quad (19)$$

$$Nk = 2^{2k} \quad (20)$$

According to the equations (13), (19), and (20), the total wiring length Lk' with the tree depth variable m being an odd number is as follows:

$$Lk' = Lk - rk \times Nk \quad (21)$$
$$= L \times (3 \times 2^{k-1} - 1) - (1/2) \times L \times (1/2^k) \times 2^{2k}$$
$$= L \times (2 \times 2^{k-1} - 1)$$

Setting a tree depth variable m' as 2k − 1, the total wiring length Lm' is expressed as follows:

$$Lm' = L \times (2 \times 2^{((m+1)/2)-1} - 1) \quad (22)$$
$$= L \times (2 \times 2^{(m/2)-1} \times 2^{1/2} - 1)$$
$$= L \times (2\sqrt{2} \times 2^{(m/2)-1} - 1)$$

Supposing a total wiring length with respect to a given tree depth is an average of a total length Lm obtainable if the given tree depth is even plus a total length Lm' obtainable if the given tree depth is odd, an approximation Lap_m of the total wiring length with respect to a tree depth m is as follows:

$$Lap\_m = (Lm + Lm')/2 \quad (23)$$
$$= (L \times ((3 + 2\sqrt{2})2^{(m/2)-1} - 2))/2$$
$$= ((3 + 2\sqrt{2})/2) \times 2^{(m/2)-1} - 1) \times L$$

According to the equations (7) and (23), the wiring length coefficient A for the tree depth m is $(3+2\sqrt{2})/2$.

According to the equations (1), (6), and (7), the power consumption F of the H-tree network is as follows:

$$F = PS + PI + PW \quad (24)$$

where the components PS, PI, and PW are expressed with the above-mentioned equations using the tree depth m as a variable. The optimum tree depth that minimizes the power consumption F is obtained by differentiating the equation (24) with respect to the tree depth m and by solving $\partial F/\partial m = 0$. The value m thus found is usually not an integer. In this case, an integer nearest to the found value m is used as a tree depth.

Figure 5:
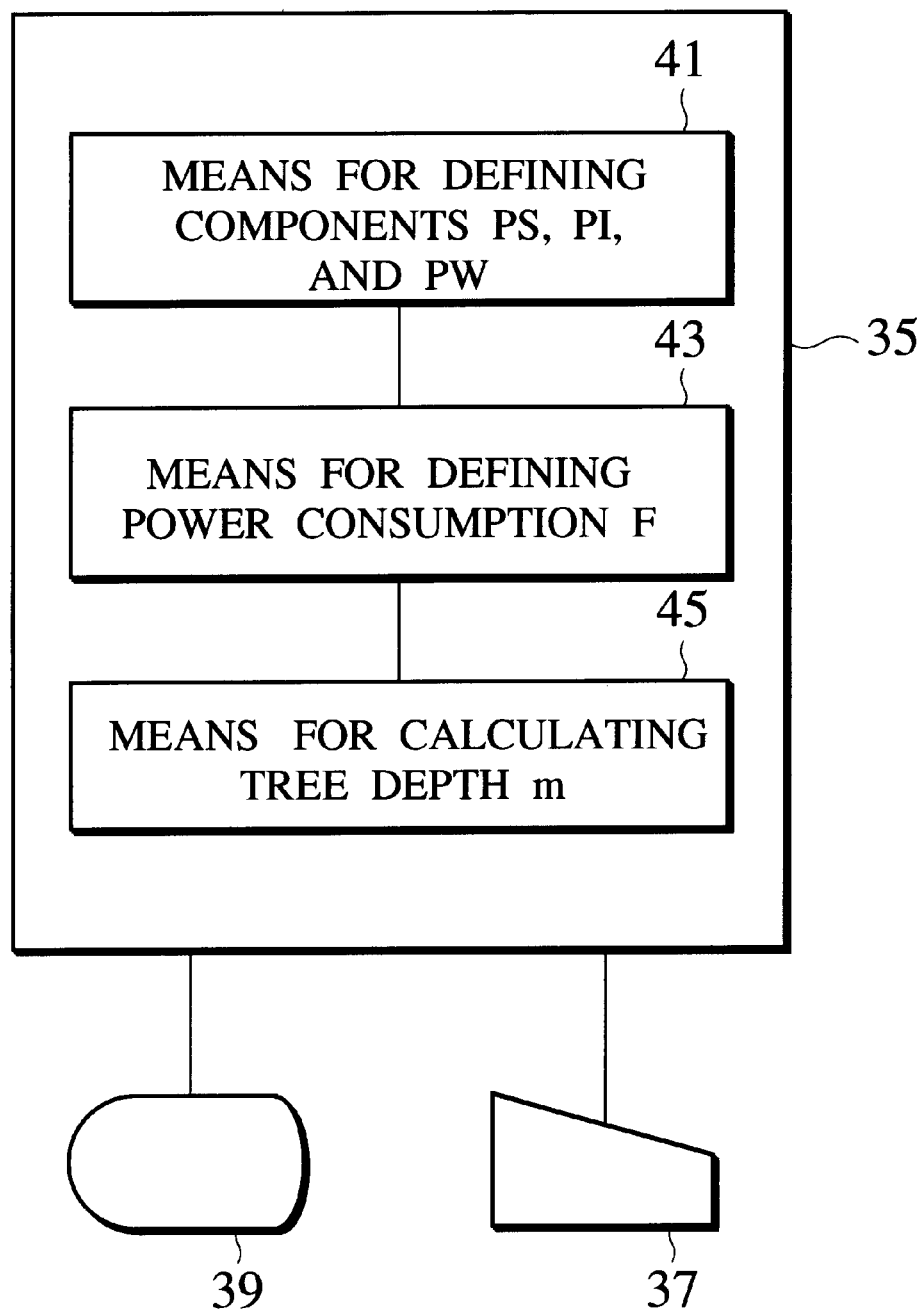
FIG. 5 is a block diagram showing an apparatus for optimizing a tree depth according to the present invention.

FIG. 5 shows an apparatus for optimizing the tree depth of an H-tree network for distributing a clock signal to elements of a semiconductor integrated circuit. The apparatus 35 may be a computer system having a CPU (not shown) for executing various processes, an input unit 37 such as a keyboard, mouse, light pen, flexible disk unit, etc., an external storage unit (not shown) such as a memory device, disk unit, etc., and an output unit 39 such as a display, printer, etc.

The apparatus 35 has software that provides means 41 for defining a short circuit current component PS, cell internal switching current component PI, and switching current of interconnect capacitance component PW related to the H-tree network, means 43 for defining the power consumption F of the H-tree network from the components PS, PI, and PW, and means 45 for calculating an optimum tree depth m according to the power consumption F.

Figure 6:
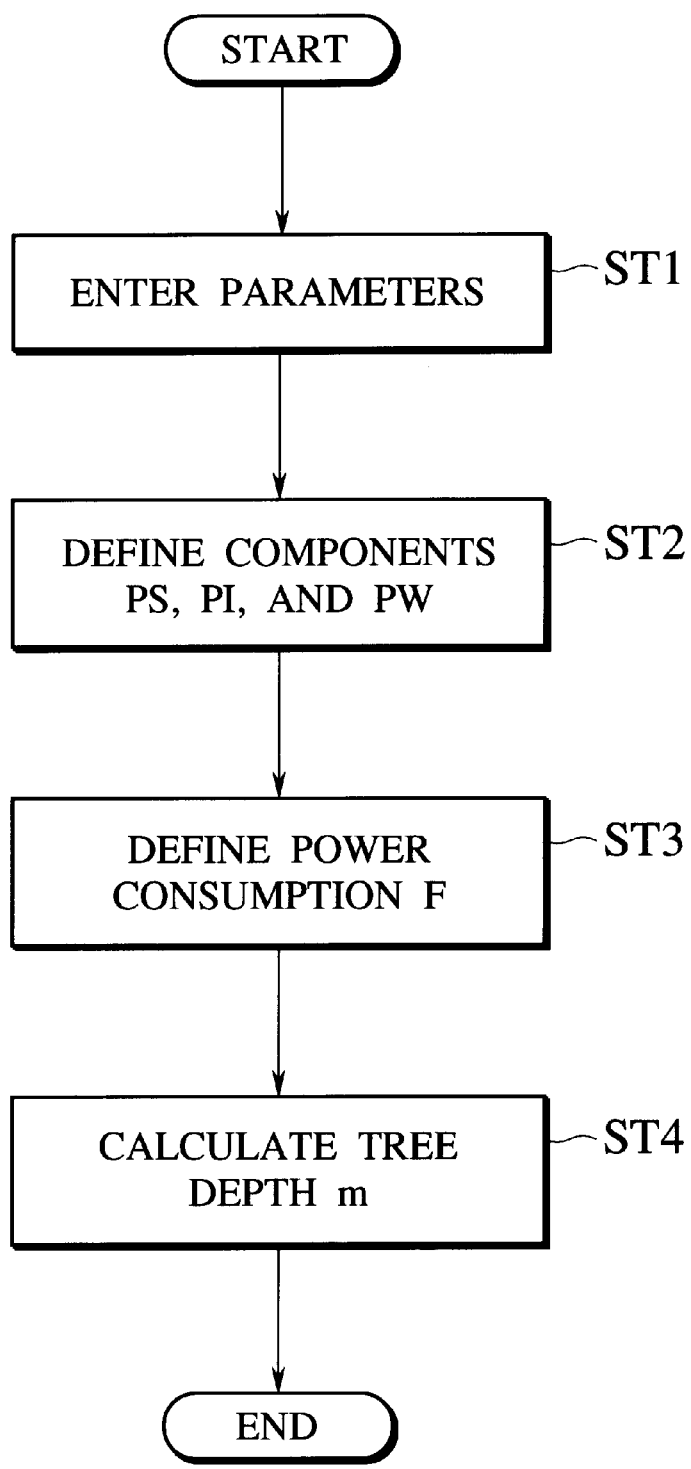
FIG. 6 is a flowchart showing a method for optimizing a tree depth according to the present invention.

FIG. 6 is a flowchart showing a process of finding an optimum tree depth for an H-tree network for distributing a clock signal to elements of a semiconductor integrated circuit. Step 1 enters various parameters such as an inclination coefficient K, the total number N of flip-flops connected to the H-tree network, the frequency f of the clock signal, a source voltage V, etc., needed for defining a short circuit current component PS, cell internal switching current component PI, and switching current of interconnect capacitance component PW related to the H-tree network with the use of a tree depth variable m.

Step 2 defines equations for the components PS, PI, and PW with the tree depth variable m based on the entered parameters.

Step 3 defines an equation for the power consumption F of the H-tree network according to the equations for the components PS, PI, and PW.

Step 4 differentiates the equation for the power consumption F with respect to the tree depth variable m and solves $\partial F/\partial m=0$. A solution of this is the optimum tree depth that minimizes the power consumption F.

In this way, the present invention is capable of easily and quickly minimizing the power consumption of an H-tree network without a knowledge of skilled designers. The present invention is also capable of reducing the designing and developing periods and manufacturing cost of semiconductor devices.

The present invention is applicable to simulate an H-tree network with a computer system before designing the H-tree network. When actually designing the H-tree network, proper adjustments may be made on the tree depth thereof calculated by the present invention, to determine an optimum tree depth that actually minimizes power consumption. The present invention is applicable not only to perfect H-tree networks but also to imperfect H-tree networks in which a repetition of H-trees is imperfect.

Various modifications will become possible for those skilled in the art after receiving the teaching of the present disclosure without departing from the scope thereof.

What is claimed is:

1. A computer operable method for optimizing a tree depth of an H-tree network for distributing a clock signal to elements of a semiconductor integrated circuit, comprising the steps of:

(a) entering parameters into the computer;
   (b) defining a short circuit current component PS, cell internal switching current component PI, and switching current of interconnect capacitance component PW of power consumption of the H-tree network with equations employing a tree depth m as a variable;
   (c) defining power consumption F of the H-tree network as the sum of the components PS, PI, and PW;
   (d) finding an optimum tree depth that minimizes the power consumption F; and
   (e) designing the H-tree network by applying the optimum tree depth,
      wherein the step (d) differentiates the power consumption F with respect to the tree depth m as $\partial F/\partial m$ and finds the tree depth that minimizes the power consumption F by solving the following equation:

$\partial F/\partial m=0$ and wherein the power consumption F of the H-tree network with the optimum tree depth is reduced as compared to the H-tree network prior to optimizing the tree depth.

2. The method of claim 1, wherein the short circuit current component PS is expressed as follows:

$$PS=K\times(C0/2^m)\times(N/2^m)\times f\times V^2$$

where m is the tree depth, K is an inclination coefficient related to short circuit currents, C0 is total load capacitance estimated as the sum of the capacitance of shortest wiring for supplying the clock signal to the elements and the load capacitance of input terminals of the elements, N is the total number of the elements, f is the frequency of the clock signal, and V is a source voltage.

3. The method of claim 1, wherein the cell internal switching current component PI is expressed as follows:

$$PI=BPWR\times2^m\times f\times V^2$$

where m is the tree depth, BPWR is the cell internal switching current per the frequency of the clock signal of each buffer cell through which the clock signal is supplied to a corresponding group of the elements, f is the frequency of the clock signal, and V is a source voltage.

4. The method of claim 1, wherein the switching current of interconnect capacitance component PW is expressed as follows:

$$PW=((A\times2^{(m/2)-1}-1)\times L\times Cunit+2^m\times Cin)\times f\times V^2$$

where m is the tree depth, L is an averaged side length of a rectangular area in which the elements are distributed, Cunit is the capacitance of a unit length, Cin is the load capacitance of an input terminal of each element, A is a wiring length coefficient depending on the tree depth m, f is the frequency of the clock signal, and V is a source voltage.

5. An apparatus for optimizing a tree depth of an H-tree network for distributing a clock signal to elements of a semiconductor integrated circuit, comprising:

(a) means for defining a short circuit current component PS, cell internal switching current component PI, and switching current of interconnect capacitance component PW of power consumption of the H-tree network with equations employing a tree depth m as a variable;
   (b) means for defining power consumption F of the H-tree network as the sum of the components PS, PI, and PW; and
   (c) means for finding a tree depth that minimizes the power consumption F
      wherein the means (c) differentiates the power consumption F with respect to the tree depth m as $\partial F/\partial m$ and finds the tree depth that minimizes the power consumption F by solving the following equation:

$\partial F/\partial m=0$.

6. The apparatus of claim 5, wherein the short circuit current component PS is expressed as follows:

$$PS=K\times(C0/2^m)\times(N/2^m)\times f\times V^2$$

where m is the tree depth, K is an inclination coefficient related to short circuit currents, C0 is total load capacitance estimated as the sum of the capacitance of shortest wiring for supplying the clock signal to the elements and the load capacitance of input terminals of the elements, N is the total number of the elements, f is the frequency of the clock signal, and V is a source voltage.

7. The apparatus of claim 5, wherein the cell internal switching current component PI is expressed as follows:

$$PI=BPWR\times2^m\times f\times V^2$$

where m is the tree depth, BPWR is the cell internal switching current per the frequency of the clock signal of each buffer cell through which the clock signal is supplied to a corresponding group of the elements, f is the frequency of the clock signal, and V is a source voltage.

8. The apparatus of claim 5, wherein the switching current of interconnect capacitance component PW is expressed as follows:

$$PW=((A\times2^{(m/2)-1}-1)\times L\times Cunit+2^m\times Cin)\times f\times V^2$$

where m is the tree depth, L is an averaged side length of a rectangular area in which the elements are distributed, Cunit is the capacitance of a unit length, Cin is the load capacitance of an input terminal of each element, A is a wiring length coefficient depending on the tree depth m, f is the frequency of the clock signal, and V is a source voltage.

* * * * *